(12) United States Patent
Sugimoto

(10) Patent No.: US 9,829,623 B2
(45) Date of Patent: Nov. 28, 2017

(54) LIGHTING DEVICE AND DISPLAY APPARATUS

(71) Applicant: Sakai Display Products Corporation, Sakai-shi, Osaka (JP)

(72) Inventor: Arimasa Sugimoto, Sakai (JP)

(73) Assignee: Sakai Display Products Corporation, Sakai-shi, Osaka (JP)

( * ) Notice: Subject to any disclaimer, the term of this patent is extended or adjusted under 35 U.S.C. 154(b) by 13 days.

(21) Appl. No.: 14/908,282

(22) PCT Filed: Jul. 18, 2014

(86) PCT No.: PCT/JP2014/069227
§ 371 (c)(1),
(2) Date: Jan. 28, 2016

(87) PCT Pub. No.: WO2015/016091
PCT Pub. Date: Feb. 5, 2015

(65) Prior Publication Data
US 2016/0170132 A1    Jun. 16, 2016

(30) Foreign Application Priority Data
Aug. 2, 2013 (JP) .................................. 2013-161478

(51) Int. Cl.
*F21V 8/00*   (2006.01)
*F21S 2/00*   (2016.01)
*G02F 1/1335* (2006.01)

(52) U.S. Cl.
CPC .............. *G02B 6/0078* (2013.01); *F21S 2/00* (2013.01); *G02B 6/008* (2013.01); *G02B 6/0011* (2013.01); *G02F 1/133615* (2013.01)

(58) Field of Classification Search
CPC ....... F21S 2/00; G02B 6/0078; G02B 6/0011; G02B 6/008; G02F 1/133615
(Continued)

(56) References Cited

U.S. PATENT DOCUMENTS 5,438,484 A     8/1995  Kanda et al.
7,616,271 B2 *  11/2009 Souk .................... G02B 6/0068
                                                  349/62
(Continued)

FOREIGN PATENT DOCUMENTS

JP   H5-158035 A     6/1993
JP   2009-283419 A   12/2009
(Continued)

*Primary Examiner* — Laura Tso
(74) *Attorney, Agent, or Firm* — Rudy J. Ng; Bret E. Field; Bozicevic, Field & Francis LLP

(57) ABSTRACT

A lighting device used as a backlight of a display apparatus includes multiple light guide plates, and a light source located near an entrance edge of each light guide plate to emit light. A gap is provided between the light guide plates, and the position of the entrance edge is fixed among the edges of the light guide plate. If the light guide plates are expanded in accordance with a change in temperature or humidity, the entrance edge do not move while the light guide plates are expanded so as to approach each other. Since the light guide plate does not hit the light source and the amount of expansion of the light guide plates is absorbed into the gap, the light source may be arranged as close as possible to the entrance edge of the light guide plate in the lighting device.

8 Claims, 11 Drawing Sheets

(58) Field of Classification Search
USPC .................................. 362/615, 616, 601, 628
See application file for complete search history.

(56) References Cited

U.S. PATENT DOCUMENTS

| | | | |
|---|---|---|---|
| 2009/0290093 A1 | 11/2009 | Shimura et al. | |
| 2010/0232178 A1* | 9/2010 | Wu ........................ | G02B 6/008 362/607 |
| 2011/0013421 A1* | 1/2011 | Um ....................... | G02B 6/0078 362/612 |
| 2011/0038177 A1* | 2/2011 | Kuwayama ........... | G02B 6/0018 362/615 |
| 2011/0038178 A1* | 2/2011 | Kuwayama ........... | G02B 6/0078 362/616 |
| 2012/0133861 A1* | 5/2012 | Ren ........................ | G02B 6/008 349/62 |
| 2014/0293191 A1* | 10/2014 | Momose .............. | G02B 6/0046 349/65 |
| 2015/0285987 A1* | 10/2015 | Yang ................. | G02F 1/133606 349/62 |

FOREIGN PATENT DOCUMENTS

| | | |
|---|---|---|
| JP | 2012-164507 A | 8/2012 |
| JP | 2012-199067 A | 10/2012 |

* cited by examiner

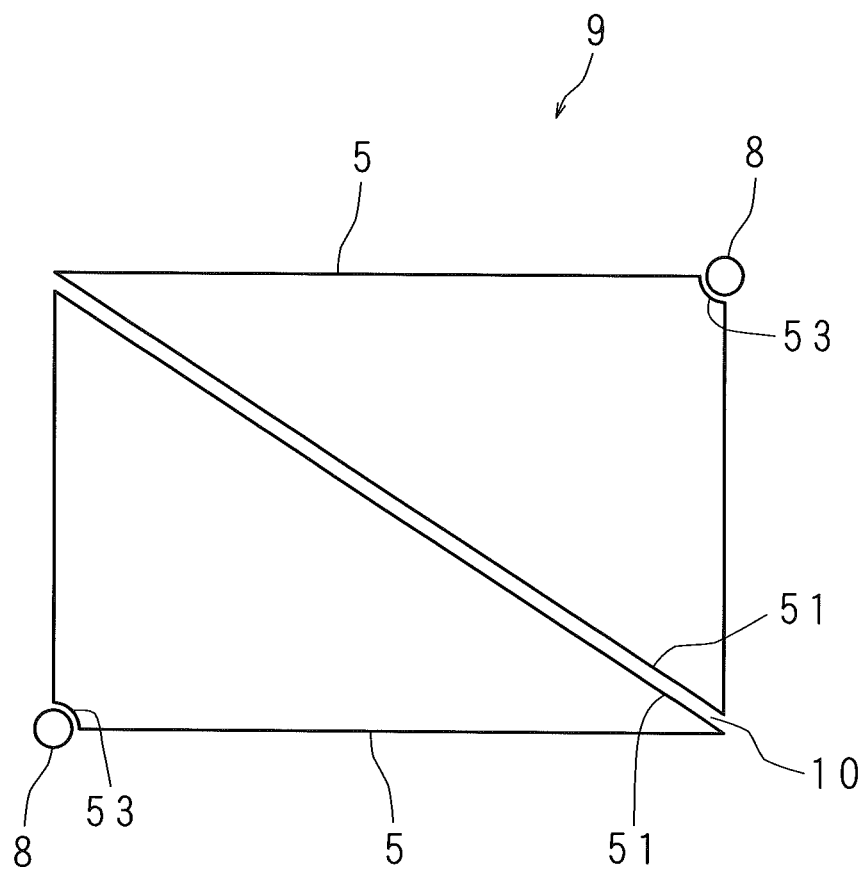
F I G. 5

LIGHTING DEVICE AND DISPLAY APPARATUS

This application is the national phase under 35 U.S.C. §371 of PCT International Application No. PCT/JP2014/069227 which has an International filing date of Jul. 18, 2014 and designated the United States of America.

BACKGROUND

1. Technical Field

The present invention relates to an edge light type lighting device emitting planar light and to a display apparatus employing the lighting device as a backlight.

2. Description of Related Art

A display apparatus for displaying an image using a non-luminescent display panel such as a liquid crystal panel includes a backlight illuminating the display panel from behind. An example of the backlight includes an edge light type backlight, in which a light guide plate is disposed at the back side of the display panel and a light source is disposed near an edge of the light guide plate. In the edge light type backlight, light from a light source enters an edge of the light guide plate, diffuses inside the light guide plate and is emitted from one planar surface of the light guide plate. As the light source, for example, a light emitting diode (LED) is used. Japanese Patent Application Laid-Open Publication No. H5-158035 describes a lighting device utilized as a backlight of a display apparatus with an increased screen size.

SUMMARY OF THE INVENTION

In the edge light type backlight, it is desirable to position an edge of a light guide plate as close as possible to a light source in order to increase the light emission efficiency. However, as the light guide plate expands and shrinks depending on the temperature or humidity, if an edge of the light guide plate is located too close to the light source in the backlight, the edge of the light guide plate which is expanded at high temperature or high humidity may have a risk of hitting and damaging the light source.

Moreover, the expanded light guide plate may be warped, and the warped light guide plate may push the display panel, causing light unevenness on the display panel. Thus, a problem has caused in that a certain distance needs to be secured between the light source and the light guide plate, which worsens the light use efficiency.

The present invention has been made in view of the circumstances described above, and aims to provide a lighting device and a display apparatus that allow an edge of a light guide plate to be as close as possible to a light source.

A lighting device according to the present invention, comprising a light guide plate having a light emitting surface for emitting incident light, is characterized by comprising: a plurality of light guide plates which have light emitting surfaces facing in a same direction and are arranged in planar shape, with a gap provided between the light guide plates; and a light source directing light to at least one of portions at an edge of each of the light guide plates that are not opposed to another light guide plate. A portion of the edge of each of the light guide plates where light enters from the light source has a fixed position.

The lighting device according to the present invention is characterized in that a size of the gap is equal to or larger than a size corresponding to an amount of expansion of the light guide plates expanding in directions along the light emitting surface in accordance with a change in temperature or humidity.

The lighting device according to the present invention is characterized in that each of the plurality of light guide plates is provided with a reflection material reflecting inside light at a portion of the edge of the light guide plates that is opposed to each other.

The lighting device according to the present invention is characterized in that two adjacent light guide plates among the plurality of light guide plates include, at portions of edges that are opposed to each other, one light guide plate having an edge face inclined at an acute angle with respect to the light emitting surface and the other light guide plate having an edge face inclined at an obtuse angle with respect to the light emitting surface, the edge faces being partly overlapped with each other in the thickness direction.

The lighting device according to the present invention is characterized in that two adjacent light guide plates among the plurality of light guide plates include, at portions of edge that are opposed to each other, protrusions protruding at positions different from each other in a thickness direction, the protrusions being partly overlapped with each other in the thickness direction.

A display apparatus according to the present invention is characterized by comprising: a display panel for displaying an image; and the lighting device according to the present invention, illuminating the display panel from one side of the display panel.

According to the present invention, the lighting device used as a backlight of the display apparatus includes multiple light guide plates and a light source directing light to an edge of each light guide plate. A gap is provided between the light guide plates, and a portion of an edge of each light guide plate where light enters from the light source has a fixed position. In the case where the light guide plates are expanded in accordance with a change in temperature or humidity, their edges near the light sources do not move while the light guide plates are expanded so as to approach each other.

Moreover, according to the present invention, the size of the gap between the light guide plates is a size corresponding to an amount of expansion of the light guide plates or larger, and the amount of expansion of the light guide plates is absorbed into the gap if the light guide plates are expanded.

Furthermore, according to the present invention, a reflection material is provided at an edge of the light guide plates that are opposed to each other. The light reached to an edge through the inside of a light guide plate is reflected by the reflection material to the inside of the light guide plate, and is finally emitted from the light emitting surface.

Furthermore, according to the present invention, two adjacent light guide plates have, at the edges that are opposed to each other, edge faces inclined with respect to the light emitting surface. The edge faces are partly overlapped with each other in the thickness direction with a gap provided in between. This eliminates a portion to which no light is emitted due to the absence of a light guide plate in the front view, and thus suppresses partial reduction in the amount of light.

In addition, according to the present invention, two adjacent light guide plates have, at the edges that are opposed to each other, protrusions protruding at positions different from each other in the thickness direction, and the protrusions are overlapped with each other in the thickness direction. The two light guide plates are reinforced at the edges that are close to each other.

According to the present invention, even if the light guide plates are expanded, the light guide plates do not hit the light source, and the amount of expansion of the light guide plates is absorbed into the gap between the light guide plates. It is thus possible for the lighting device to have an arrangement in which the light source is located as close as possible to an edge of the light guide plate, which allows the light from the light source to enter the light guide plate with high efficiency. The present invention therefore produces a beneficial effect of, for example, improved use efficiency of light for displaying an image at the display apparatus.

The above and further objects and features of the invention will more fully be apparent from the following detailed description with accompanying drawings.

BRIEF DESCRIPTION OF THE SEVERAL VIEWS OF THE DRAWINGS

FIG. 5 is a schematic front view of a lighting device according to Embodiment 3;

DETAILED DESCRIPTION

The present invention will be described below with reference to the drawings illustrating the embodiments thereof.

Embodiment 1

Figure 1:
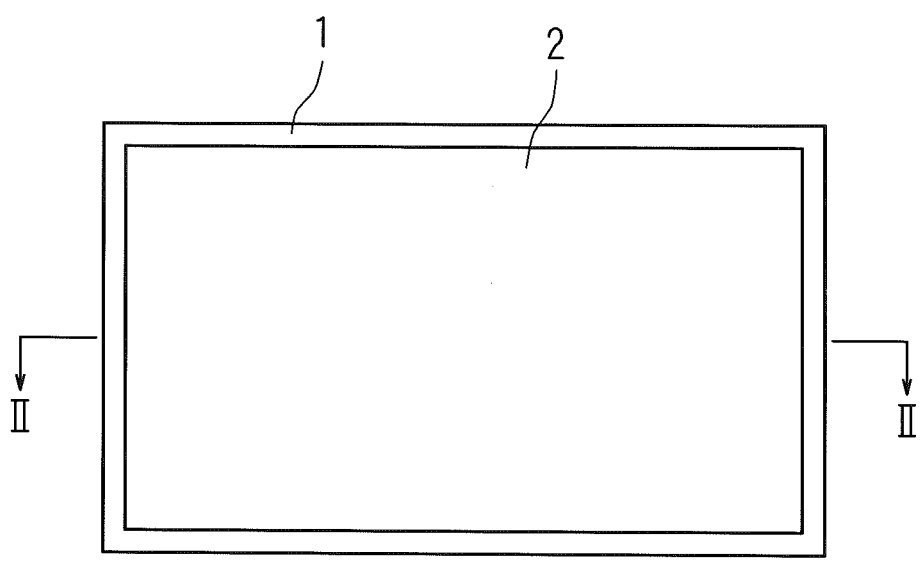
FIG. 1 is a front view of a display apparatus.

FIG. 1 is a front view of a display apparatus. The display apparatus is a television receiver, for example. The display apparatus includes a non-luminescent display panel 2 having the shape of a rectangular plate, and a backlight. The backlight is composed of a lighting device according to the present invention. The display panel 2 is illuminated by the backlight from the back side to display an image. The display panel 2 is a liquid crystal panel, for example. The circumferential part of the display panel 2 is covered by a bezel 1. The bezel 1 is a frame-like member made of metal, and covers the circumferential part of the front surface and the side surfaces of the display apparatus.

Figure 2:
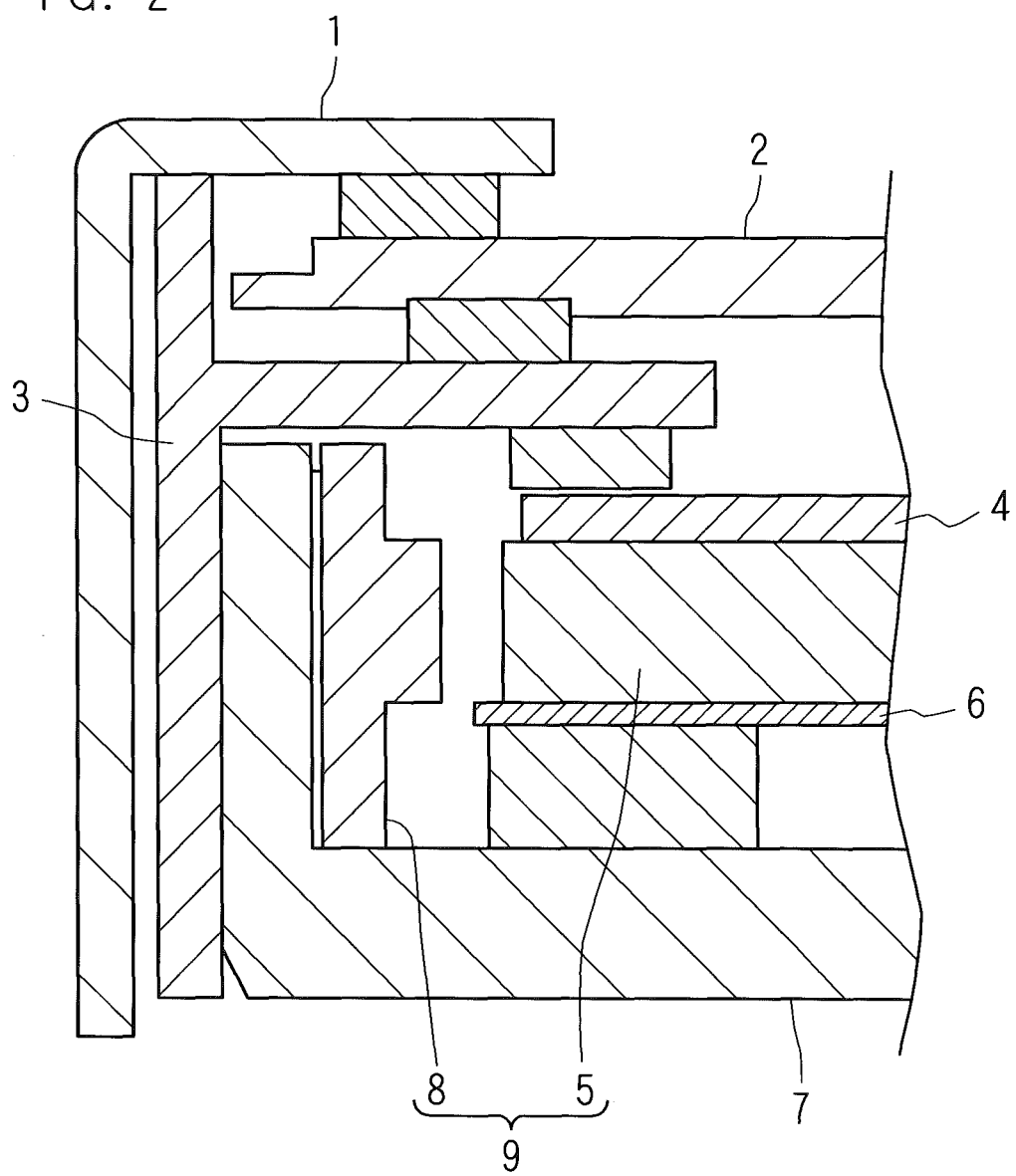
FIG. 2 is an enlarged section view of a part of a cross section along II-II in FIG. 1.

FIG. 2 is an enlarged section view of a part of a cross section along II-II in FIG. 1. FIG. 2 is a view obtained by enlarging a portion, of the cross section along II-II in FIG. 1, near a short side of the display apparatus. The upper side in FIG. 2 corresponds to the front side of the display apparatus. At the back side of the display panel 2, the first chassis 3 of a rectangular frame-like shape is disposed. The first chassis 3 is made of resin or metal, and supports the display panel 2 from the back side. A portion of the bezel 1 is located at the front side of the circumferential part of the display panel 2, while a portion of the first chassis 3 is located at the back side of the circumferential part of the display panel 2. The display panel 2 is held between the bezel 1 and the first chassis 3 through spacers.

At the back side of the first chassis 3, an optical sheet 4 which diffuses and condenses light from the backlight is disposed. The optical sheet 4 is constituted by laminating multiple sheets such as a sheet having a function of diffusing light from the backlight and a sheet having a function of condensing such light, and transmits the light therethrough. At the back side of the optical sheet 4, a light guide plate 5 is disposed, and a rectangular reflection sheet 6 is disposed at the back side of the light guide plate 5. The light guide plate 5 has an edge face receiving incident light and a front face serving as a light emitting surface to emit light. The light emitted from the light guide plate 5 illuminates the display panel 2 from the back side. At the back side of the reflection sheet 6, a heat dissipation plate 7 made of metal is disposed. As illustrated in FIG. 2, a portion of the first chassis 3 is located at the front side of the circumferential part of the optical sheet 4, and the heat dissipation plate 7 is disposed at the back side of the reflection sheet 6. The optical sheet 4, light guide plate 5 and reflection sheet 6 are held between the first chassis 3 and the heat dissipation plate 7 through the spacers. The optical sheet 4 may also be located at the front side of the first chassis 3.

The heat dissipation plate 7 is disposed near both short sides of the reflection sheet 6. At the side of the light guide plate 5, the heat dissipation plate 7, the first chassis 3 and the bezel 1 are overlapped. At the further back side of the reflection sheet 6 and the heat dissipation plate 7, the second chassis (not illustrated) is disposed. The second chassis supports the entire display apparatus.

A light source 8 which directs light to the light guide plate 5 is attached to the heat dissipation plate 7. The light source 8 is so configured that LEDs are mounted on an LED substrate. The light source 8 is located at a position where the LEDs are opposed to an edge face of the light guide plate 5. The heat dissipation plate 7 is preferably made of metal with high thermal conductivity such as aluminum so that heat from the light source 8 may efficiently be dissipated. The light guide plate 5 and the light source 8 constitute a lighting device 9 according to the present embodiment, and are used as a backlight in the display apparatus.

Figure 3:
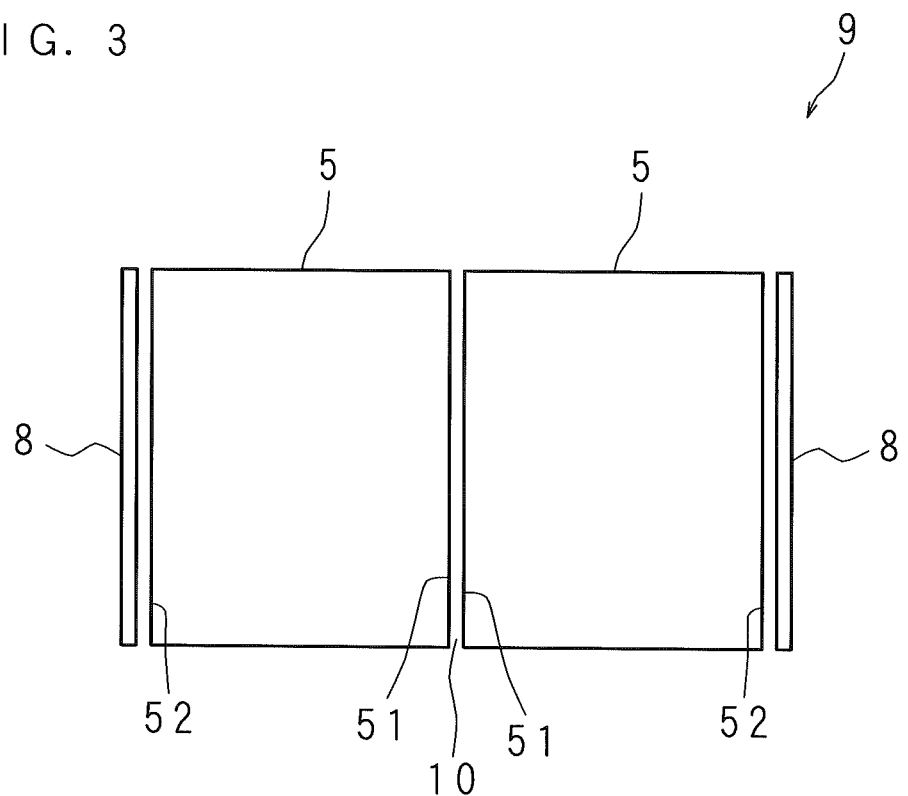
FIG. 3 is a schematic front view of a lighting device according to Embodiment 1.

FIG. 3 is a schematic front view of the lighting device 9 according to Embodiment 1. The lighting device 9 includes two rectangular light guide plates 5, 5 aligned in the long side direction of the display panel 2. The light emitting surfaces of the light guide plates 5, 5 face the same direction. The light guide plates 5, 5 are formed by dividing a light guide plate of the same shape as that of the display panel 2 at the middle in the long side direction so as to be in parallel with the short sides. Each of the light guide plates 5, 5 has a rectangular shape. An edge of each of the light guide plates 5 corresponds to a side of a rectangle. One of four edges of a light guide plate 5 forms an opposite edge 51 which is opposed to the other light guide plate 5. The edge opposed to the opposite edge 51 in the light guide plate 5 serves as an entrance edge 52 where light from the light source 8 enters. The opposite edge 51 and the entrance edge 52 are substantially parallel to the short side direction of the display panel 2. The light source 8 is disposed at a position near the entrance edge 52 of each of the light guide plates 5. As illustrated in FIG. 2, the entrance edge 52 has an edge face substantially orthogonal to the light emitting surface, and the light source 8 is arranged to be opposed to the edge face. The light source 8 is configured to include multiple LEDs that are linearly aligned along the entrance edge 52 which is a side of the rectangle. The light from the light source 8 enters the entrance edge 52 of the light guide plate 5, diffuses inside the light guide plate 5, and is emitted from the light emitting surface of the light guide plate 5 in the front face direction. In the lighting device 9, among the edges of each of the light guide plates 5, 5, the positions of the entrance edges 52 are fixed in the direction along the light emitting surface. On the other hand, the positions of the opposite edges 51 are not fixed in the direction along the light emitting surface. Moreover, a gap 10 is provided between the light guide plates 5 and 5. Since no light is emitted from the gap 10, the light for illuminating the display panel 2 is partly decreased. The optical sheet 4 may however serve to diffuse light, which prevents light unevenness from occurring on the display panel 2.

Even if the light guide plate 5 is expanded in accordance with a change in temperature or humidity, the position of the entrance edge 52 of the light guide plate 5 is fixed, preventing the entrance edge 52 from hitting the light source 8. Therefore, the light source 8 is not damaged at high temperature or high humidity. On the other hand, since the position of the opposite edge 51 is not fixed, the opposite edges 51 of the respective light guide plates 5, 5 extend in the directions approaching each other when the light guide plates 5, 5 are expanded. The length of the gap 10 between the light guide plates 5 and 5 is equal to or more than the total length by which the opposite edges 51 extend in the directions approaching each other when the light guide plates 5, 5 are expanded in accordance with a change in temperature or humidity. Thus, even if the light guide plates 5, 5 are expanded, the amount of expansion of the light guide plates 5, 5 is absorbed into the gap 10, so that no warp is generated at the light guide plates 5, 5. Since no warp is generated at the light guide plates 5, 5, the display panel 2 is not pushed by warped light guide plates 5, 5, not causing light unevenness on the display panel 2. As such, no problem occurs at expansion of the light guide plates 5, 5 in the lighting device 9, making it unnecessary to secure a distance between the light guide plate 5 and the light source 8 for avoiding a problem caused at the time of expansion. Accordingly, in the lighting device 9, the light guide plates 5, 5 and the light sources 8, 8 are disposed while the light source 8 is located as close as possible to the entrance edge 52 of the light guide plate 5. As the light source 8 is located as close as possible to the entrance edge 52 of the light guide plate 5, light enters from the light source 8 to the light guide plate 5 with high efficiency, improving the use efficiency of light for displaying an image at the display apparatus.

Embodiment 2

Figure 4:
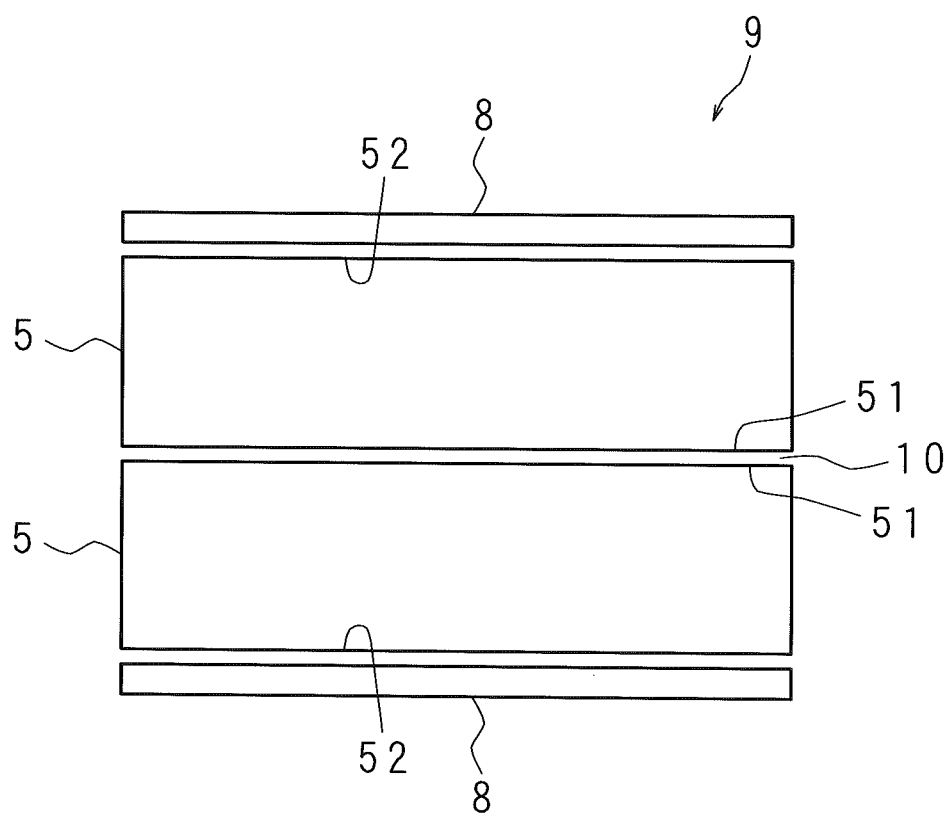
FIG. 4 is a schematic front view of a lighting device according to Embodiment 2.

FIG. 4 is a schematic front view of a lighting device 9 according to Embodiment 2. The lighting device 9 includes two rectangular light guide plates 5, 5 aligned in the short side direction of a display panel 2. The light guide plates 5, 5 are formed by dividing a light guide plate of the same shape as that of the display panel 2 at the middle in the short side direction so as to be in parallel with the long sides. Each of the light guide plates 5 has a rectangular shape. An edge of each of the light guide plates 5 corresponds to a side of a rectangle. The light guide plate 5 has an opposite edge 51 opposed to the other light guide plate 5, and the edge opposed to the opposite edge 51 in the light guide plate 5 serves as an entrance edge 52. The opposite edge 51 and the entrance edge 52 are substantially parallel to the long side direction of the display panel 2. The light source 8 is disposed at a position near the entrance edge 52 of each of the light guide plates 5 so as to be opposed to the edge face thereof. The light source 8 is configured to include multiple LEDs that are linearly aligned along the entrance edge 52 which is a side of the rectangle. The display apparatus includes the lighting device 9, and is configured similarly to that in Embodiment 1, except for the light guide plates 5, 5 and light sources 8, 8.

As in Embodiment 1, for each of the light guide plates 5, 5, the position of the entrance edge 52 is fixed in the direction along the light emitting surface. A gap 10 is provided between the light guide plates 5 and 5. The length of the gap 10 is equal to or more than the total length by which the opposite edges 51 extend in the directions approaching each other when the light guide plates 5, 5 are expanded in accordance with a change in temperature or humidity. Moreover, the position of the opposite edge 51 of the light guide plate 5 is not fixed in the direction along the light emitting surface.

According to the present embodiment, as in Embodiment 1, even if the light guide plate 5 is expanded in accordance with a change in temperature or humidity, the entrance edge 52 of the light guide plate 5 does not hit the light source 8. Furthermore, as the amount of expansion of the light guide plates 5, 5 is absorbed into the gap 10, no warp is generated at the light guide plates 5, 5, and the display panel 2 is not pushed by warped light guide plates 5, 5, not causing light unevenness. As in Embodiment 1, in the lighting device 9, the light source 8 is disposed as close as possible to the entrance edge 52 of the light guide plate 5, which improves the use efficiency of light for displaying an image at the display apparatus.

Embodiment 3

FIG. 5 is a schematic front view of a lighting device 9 according to Embodiment 3. The lighting device 9 includes two light guide plates 5, 5 aligned in a diagonal direction of a display panel 2. The light guide plates 5, 5 are formed by dividing a light guide plate of the same shape as that of the display panel 2 into two parts along one diagonal line, each of the light guide plates 5 having a shape of a substantially right-angled triangle. The hypotenuse of the light guide plate 5 forms an opposite edge 51 opposed to the other light guide plate 5. The corner opposed to the opposite edge 51 in the light guide plate 5 serves as an entrance edge 53 where light enters. The entrance edge 53 has an edge face substantially orthogonal to the light emitting surface. The light source 8 is located at a position near the entrance edge 53 of each light guide plate 5 so as to be opposed to the edge face thereof. The light source 8 is a point light source configured with LEDs. The light from the light source 8 enters the entrance edge 53, diffuses inside the light guide plate 5, and is emitted from the light emitting surface in the front face direction. The display apparatus includes the lighting device 9, and is configured similarly to Embodiment 1 except for the light guide plates 5, 5 and light sources 8, 8.

In each of the light guide plates 5, 5, the position of the entrance edge 53 is fixed. A gap 10 is provided between the light guide plates 5 and 5. The length of the gap 10 is equal to or more than the total length by which the opposite edges 51 extend in the directions approaching each other when the light guide plates 5, 5 are expanded in accordance with a change in temperature or humidity. Furthermore, the position of the opposite edge 51 of the light guide plate 5 is not fixed in the direction along the light emitting surface. It is to be noted that the lighting device 9 is not limited to the form where a corner of the light guide plate 5 serves as the entrance edge 53 but may also take a form where one side other than the opposite edge 51 serves as a light entrance edge. In such a form, the light source 8 is configured to include multiple LEDs that are linearly aligned along the entrance edge which is a side of the light guide plate 5.

According to the present embodiment, as in Embodiment 1, even if the light guide plate 5 is expanded in accordance with a change in temperature or humidity, the entrance edge 53 of the light guide plate 5 does not hit the light source 8. Moreover, as the amount of expansion of the light guide plates 5, 5 is absorbed into the gap 10, no warp is generated at the light guide plates 5, 5, and therefore the display panel 2 is not pushed by warped light guide plates 5, 5, not causing light unevenness on the display panel 2. As in Embodiment 1, in the lighting device 9, the light source 8 is located as close as possible to the entrance edge 53 of the light guide plate 5, improving the use efficiency of light for displaying an image at the display apparatus.

Embodiment 4

Figure 6:
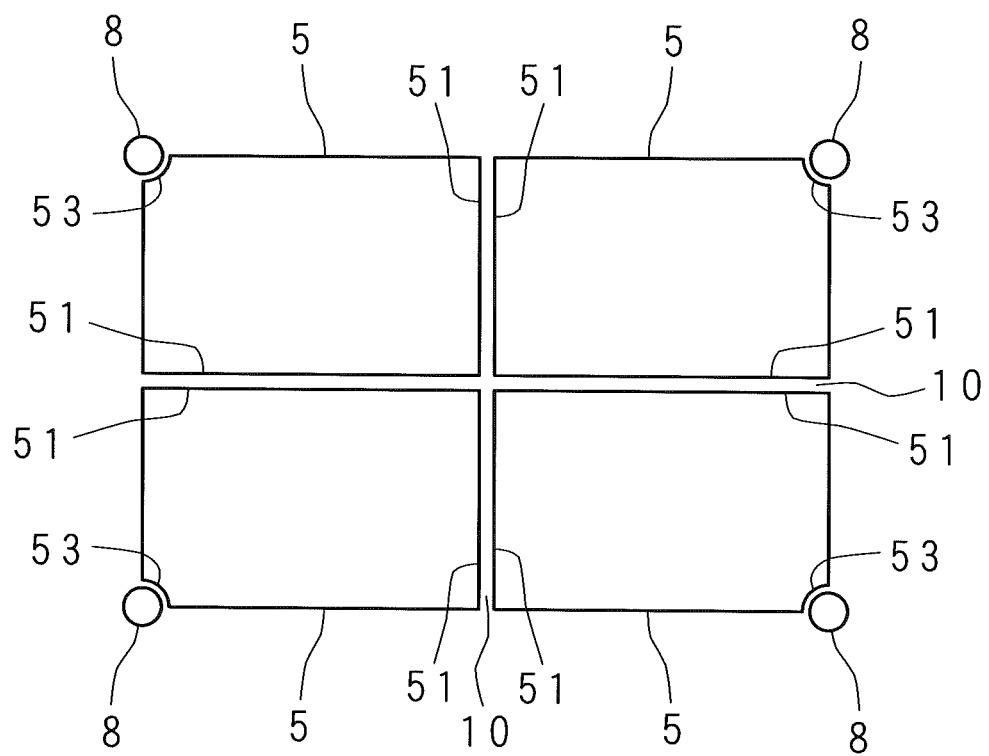
FIG. 6 is a schematic front view of a lighting device according to Embodiment 4.

FIG. 6 is a schematic front view of a lighting device 9 according to Embodiment 4. The lighting device 9 includes four light guide plates 5, 5 . . . arranged in matrix. The light guide plates 5, 5 . . . have light emitting surfaces facing the same direction. The light guide plates 5, 5 . . . are formed by dividing a light guide plate of the same shape as that of the display panel 2 at the middle in the short side direction so as to be in parallel with the long sides and also by dividing at the middle in the long side direction so as to be in parallel with the short sides. Each of the light guide plates 5 has a rectangular shape. Two adjacent sides of the light guide plate 5 correspond to opposite edges 51 opposed to the other light guide plate 5. In each of the light guide plate 5, a corner not being adjacent to any of the opposite edges 51, 51 that are two adjacent sides serves as an entrance edge 53 where light enters. The entrance edge 53 has an edge face substantially orthogonal to the light emitting surface. The light source 8 is disposed at a position near the entrance edge 53 of each light guide plate 5 so as to be opposed to the edge face thereof. The light source 8 is a point light source constituted using LEDs. Light from the light source 8 enters the entrance edge 53, diffuses inside the light guide plate 5, and is emitted from the light emitting surface in the front face direction. The display apparatus includes the lighting device 9, and is configured similarly to that in Embodiment 1 except for the light guide plates 5, 5 . . . and the light sources 8, 8 . . . .

In each of the light guide plates 5, 5 . . . , the position of the entrance edge 53 is fixed. A gap 10 is provided between two adjacent light guide plates 5 and 5. The length of the gap 10 is equal to or more than the total length by which the opposite edges 51 extend in the directions approaching each other when the light guide plates 5, 5 are expanded in accordance with a change in temperature or humidity. Moreover, the position of the opposite edge 51 of the light guide plate 5 is not fixed in the direction along the light emitting surface. It is to be noted that the lighting device 9 is not limited to the form where a corner of the light guide plate 5 serves as the entrance edge 53 but may also take a form where one side opposed to the opposite edge 51 of the light guide plate 5 serves as a light entrance edge. In such a form, the light source 8 is configured to include multiple LEDs that are linearly aligned along the entrance edge which is one side of the light guide plate 5.

In the present embodiment, even if the light guide plate 5 is expanded, the entrance edge 53 does not hit the light source 8, not damaging the light source 8 at high temperature or high humidity. While the light guide plates 5, 5 . . . extend in the directions approaching each other when expanded, the amount of expansion is absorbed into the gap 10, and no warp is generated at the light guide plates 5, 5 . . . . As such, the display panel 2 is not pushed by warped light guide plates 5, 5 . . . , not causing light unevenness on the display panel 2. As in Embodiment 1, in the lighting device 9, the light source 8 is located as close as possible to the entrance edge 53 of the light guide plate 5, improving the use efficiency of light for displaying an image at the display apparatus.

Embodiment 5

Figure 7:
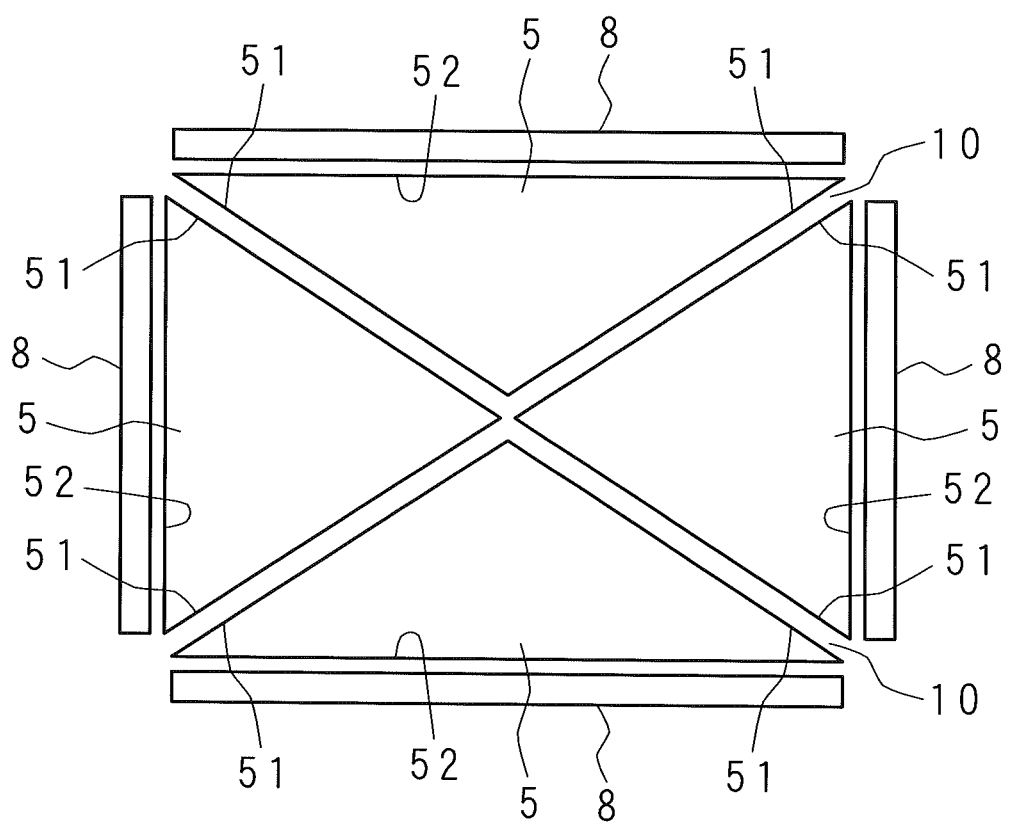
FIG. 7 is a schematic front view of a lighting device according to Embodiment 5.

FIG. 7 is a schematic front view of a lighting device 9 according to Embodiment 5. The lighting device 9 includes four light guide plates 5, 5 . . . so arranged that their light emitting surfaces facing the same direction. The light guide plates 5, 5 . . . are formed by dividing a light guide plate of the same shape as that of the display panel 2 along two diagonal lines. Each of the light guide plates 5, 5 . . . has the shape of a triangle. Two of the three sides of the light guide plate 5 correspond to opposite edges opposed to the other light guide plate 5. The side different from the opposite edges 51, 51 in the light guide plate 5 serves as an entrance edge 52 where light enters. The entrance edge 52 has an edge face substantially orthogonal to the light emitting surface. The light source 8 is located at a position near the entrance edge 52 of each light guide plate 5 so as to be opposed to the edge face thereof. The light source 8 is configured to include multiple LEDs that are linearly aligned along the entrance edge 52. Light from the light source 8 enters the entrance edge 52, diffuses inside the light guide plate 5, and is emitted from the light emitting surface in the front face direction. The display apparatus includes the lighting device 9, and is configured similarly to that in Embodiment 1 except for the light guide plates 5, 5 . . . and the light sources 8, 8 . . . .

In each of the light guide plates 5, 5 . . . , the position of the entrance edge 52 is fixed. A gap 10 is provided between two adjacent light guide plates 5 and 5. The length of the gap 10 is equal to or more than the total length by which the opposite edges 51 extend in the directions approaching each other when the light guide plates 5, 5 are expanded in accordance with a change in temperature or humidity. Moreover, the position of the opposite edge 51 of the light guide plate 5 is not fixed in the direction along the light emitting surface.

According to the present embodiment, as in Embodiment 4, even if the light guide plate 5 is expanded, the entrance edge 52 does not hit the light source 8. Moreover, as the amount of expansion of the light guide plates 5, 5 is absorbed into the gap 10, no warp is generated at the light guide plates 5, 5, and therefore the display panel 2 is not pushed by warped light guide plates 5, 5, not causing light unevenness on the display panel 2. As in Embodiment 1, in the lighting device 9, the light source 8 is located as close as possible to the entrance edge 52 of the light guide plate 5, improving the use efficiency of light for displaying an image at the display apparatus.

Embodiment 6

Figure 8:
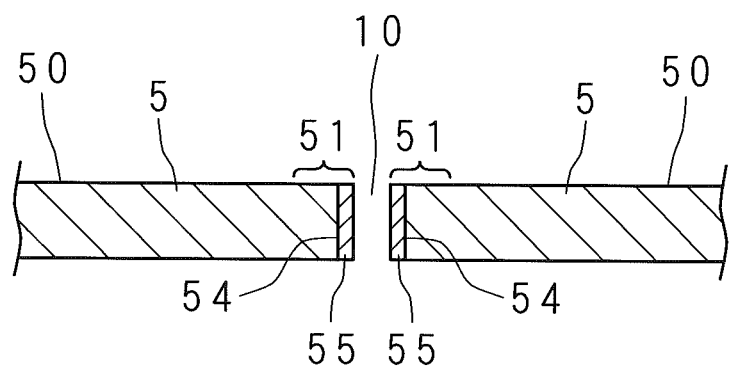
FIG. 8 is a schematic section view of a light guide plate according to Embodiment 6.

Multiple light guide plates 5 and light sources 8 in a lighting device 9 according to Embodiment 6 are configured similarly to any one of those in Embodiments 1 to 5. Moreover, the display apparatus includes the lighting device 9, and is configured similarly to that in Embodiment 1 except for the multiple light guide plates 5 and light sources 8. FIG. 8 is a schematic section view of a light guide plate 5 according to Embodiment 6. An opposite edge 51 of the light guide plate 5 has an edge face 54 crossing a light emitting surface 50. The edge faces 54, 54 of adjacent light guide plates 5, 5 are opposed to each other. A reflection sheet (reflection material) 55 is adhered to the edge face 54. The reflection sheet 55 reflects light that passed through the inside of the light guide plate 5 and reached the edge face 54 to the inside of the light guide plate 5. The light which entered from the light source 8 and diffused inside the light guide plate 5 is blocked by the reflection sheet 55 from being emitted from the edge face 54, is returned to the inside of the light guide plate 5, and is finally emitted from the light emitting surface 50. Among the light entered inside the light guide plate 5, the amount of light emitted from the edge face 54 but not contributing to illumination of the display panel 2 is reduced, which increases the light use efficiency. It is to be noted that the lighting device 9 is not limited to the form where the reflection sheet 55 is adhered but may also take a form where a reflection material is applied or vapor-deposited onto the edge face 54.

Embodiment 7

Figure 9:
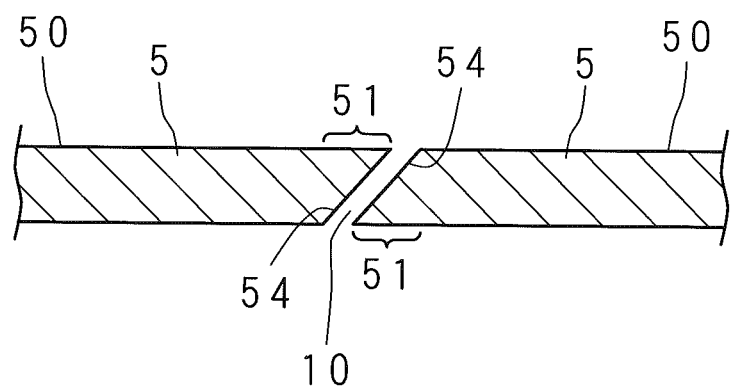
FIG. 9 is a schematic section view of a light guide plate according to Embodiment 7.

Multiple light guide plates 5 and light sources 8 in a lighting device 9 according to Embodiment 7 are configured similarly to those in any one of Embodiments 1 to 5. Moreover, the display apparatus includes the lighting device 9, and is configured similarly to that in Embodiment 1 except for the light guide plates 5 and light sources 8. FIG. 9 is a schematic section view of the light guide plate 5 according to Embodiment 7. An opposite edge 51 of the light guide plate 5 has an edge face 54 inclined with respect to a light emitting surface 50. In adjacent light guide plates 5, 5, one edge face 54 is inclined at an acute angle with respect to the light emitting surface 50 whereas the other edge face 54 is inclined at an obtuse angle with respect to the light emitting surface 50, the edge faces 54 being opposed to each other. The edge faces 54, 54 of the adjacent light guide plates 5, 5 are substantially parallel to each other, and are partly overlapped in the thickness direction with a gap 10 provided in between.

Since the edge faces 54, 54 of the adjacent light guide plates 5, 5 are partly overlapped in the thickness direction, in the front view, a part of the edge faces 54 is present between the light emitting surfaces 50, 50, and there is no part where the light guide plate 5 is absent. Furthermore, the light guide plate 5 may emit light from its edge face 54. It is thus possible to emit light from a position between the light emitting surfaces 50 and 50 in the front view. In the form where the edge face 54 is substantially orthogonal to the light emitting surface 50, a portion to which no light is emitted in the front view is present due to the absence of the light guide plate 5. According to the present embodiment, however, a portion to which no light is emitted in the front view due to the absence of the light guide plate 5 does not exist, which suppresses partial reduction in the amount of light. It is therefore possible to alleviate light unevenness on the display panel 2 due to reduction in the amount of light at the position between the light emitting surfaces 50 and 50.

Figure 10:
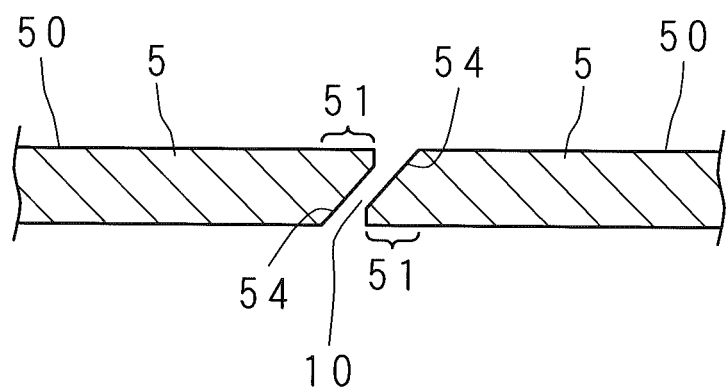
FIG. 10 is a schematic section view of another example of the light guide plate according to Embodiment 7.

FIG. 10 is a schematic section view of another example of the light guide plates 5 according to Embodiment 7. At an opposite edge 51 of the light guide plate 5, a tip end is formed by an edge face 54 being inclined with respect to the light emitting surface 50. In the example illustrated in FIG. 10, a corner of the tip end of the opposite edge 51 is chamfered. By the tip end of the opposite edge 51 being chamfered, the opposite edge 51 has an increased strength. This prevents the light guide plate 5 from being damaged, thereby improving the durability of the lighting device 9 and the display apparatus.

Embodiment 8

Figure 11:
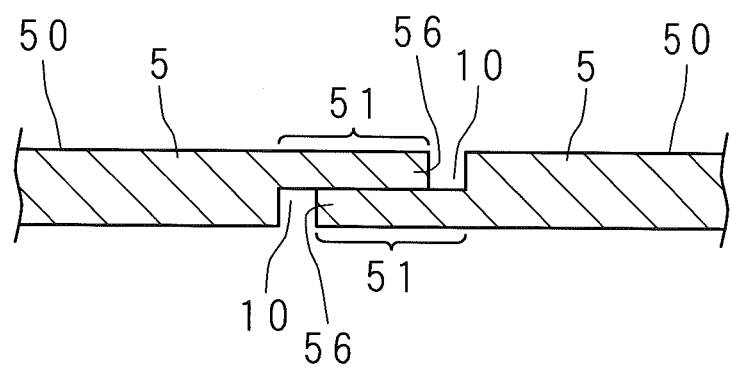
FIG. 11 is a schematic section view of a light guide plate according to Embodiment 8.

Multiple light guide plates 5 and light sources 8 of a lighting device 9 according to Embodiment 8 are configured similarly to any one of those in Embodiments 1 to 5. Moreover, the display apparatus includes a lighting device 9, and is configured similarly to that in Embodiment 1 except for the light guide plates 5 and light sources 8. FIG. 11 is a schematic section view of the light guide plates 5 according to Embodiment 8. The opposite edges 51, 51 of the adjacent light guide plates 5, 5 respectively have protrusions 56, 56 with parts thereof in the thickness direction protruding at positions different from each other in the thickness direction. In the example illustrated in FIG. 11, one of the opposite edges 51, 51 has a protrusion 56 corresponding to a portion including the light emitting surface 50 whereas the other one thereof has a protrusion 56 corresponding to a portion including the rear surface of the light guide plate 56. The protrusions 56, 56 of the adjacent light guide plates 5, 5 are overlapped in the thickness direction. The protrusions 56, 56 overlapped in the thickness direction are in contact with each other. Furthermore, a gap 10 is provided between the adjacent light guide plates 5 and 5 in the direction along the light emitting surface 50.

According to the present embodiment, the opposite edges 51, 51 of adjacent light guide plates 5, 5 are partly overlapped in the thickness direction. Thus, as in Embodiment 7, light can be emitted from a position between the light emitting surfaces 50 and 50 in the front view, alleviating reduction in the amount of light also at the position between the light emitting surfaces 50 and 50. It is therefore possible to alleviate light unevenness on the display panel 2 due to reduction in the amount of light at the position between the light emitting surfaces 50 and 50. Moreover, according to the present embodiment, the opposite edges 51, 51 of the adjacent light guide plates 5, 5 are partly overlapped, so that the opposite edges 51, 51 of the light guide plates 5, 5 are reinforced with each other. Accordingly, damage to the light guide plate 5 may be prevented, improving the durability of the lighting device 9 and the display apparatus. It is to be noted that the tip end of the protrusion 56 may be provided with a reflection material as in Embodiment 6.

While Embodiments 1 to 8 illustrate a form where LEDs are used as the light source 8, the lighting device 9 may also take a form of using a light source other than LEDs, such as a cold-cathode tube or the like. Furthermore, though Embodiments 1 to 8 illustrate a form where the lighting device 9 is employed as a backlight of the display apparatus, the lighting device 9 may also be employed for a purpose other than the backlight, such as for wall lighting or the like.

It is noted that, as used herein and in the appended claims, the singular forms "a", "an", and "the" include plural referents unless the context clearly dictates otherwise.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A lighting device, comprising:
   a plurality of light guide plates which have light emitting surfaces facing in a same direction for emitting incident light and are arranged in planar shape, with a gap provided between the light guide plates; and
   a light source directing light to at least one of portions at an edge of each of the light guide plates that are not opposed to another light guide plate,
   wherein a portion of the edge of each of the light guide plates where light enters from the light source has a fixed position, and a portion of the edge of each of the light guide plates that is opposed to another light guide plate is not fixed in the direction along the light emitting surface.

2. The lighting device according to claim 1, wherein a size of the gap is equal to or larger than a size corresponding to an amount of expansion of the light guide plates expanding in directions along the light emitting surface in accordance with a change in temperature or humidity.

3. The lighting device according to claim 1, wherein each of the plurality of light guide plates is provided with a reflection material reflecting inside light at a portion of the edge of the light guide plates that is opposed to each other.

4. The lighting device according to claim 1, wherein
   one light guide plate of two adjacent light guide plates includes, at a portion of the edge that is opposed to the other light guide plate, an edge face inclined at an acute angle with respect to the light emitting surface,
   the other light guide plate of the two adjacent light guide plates includes, at a portion of the edge that is opposed to the one light guide plate, an edge face inclined at an obtuse angle with respect to the light emitting surface, and
   the edge faces of the two adjacent light guide plates are partly overlapped with each other in the thickness direction.

5. The lighting device according to claim 1, wherein
   two adjacent light guide plates include, at portions of edge that are opposed to each other, protrusions protruding at positions different from each other in a thickness direction, and
   the protrusions of the two adjacent light guide plates are partly overlapped with each other in the thickness direction.

6. A display apparatus, comprising:
   a display panel for displaying an image; and
   the lighting device according to claim 1, illuminating the display panel from one side of the display panel.

7. The lighting device according to claim 4, wherein the edge of the one light guide plate that is opposed to the other light guide plate is chamfered.

8. The lighting device according to claim 4, wherein the edge of the other light guide plate that is opposed to the one light guide plate is chamfered.

* * * * *